3,320,686
BALL DROP
Walter L. Blackburn, 6105 England St.,
Houston, Tex. 77021
Filed Dec. 4, 1964, Ser. No. 415,890
8 Claims. (Cl. 35—19)

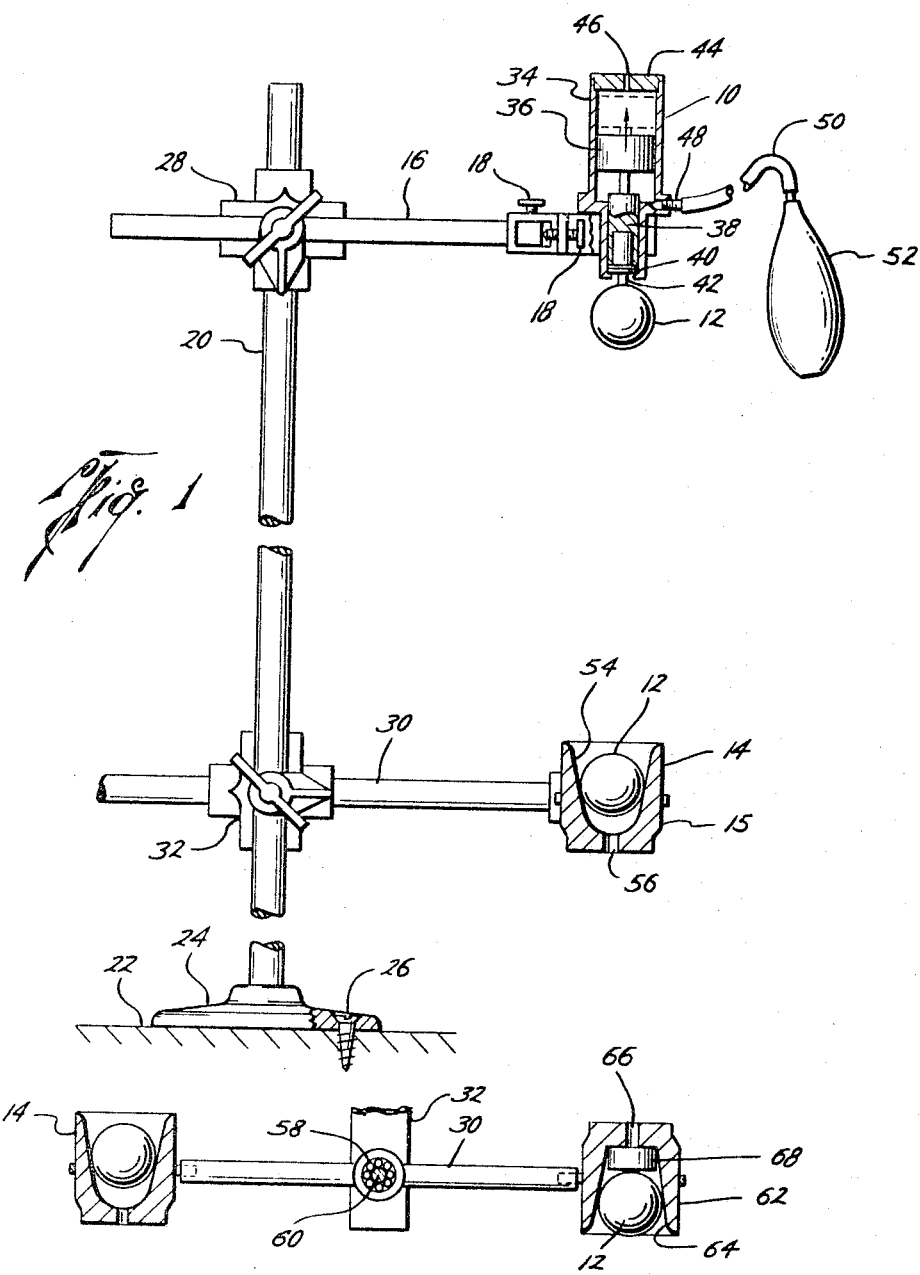

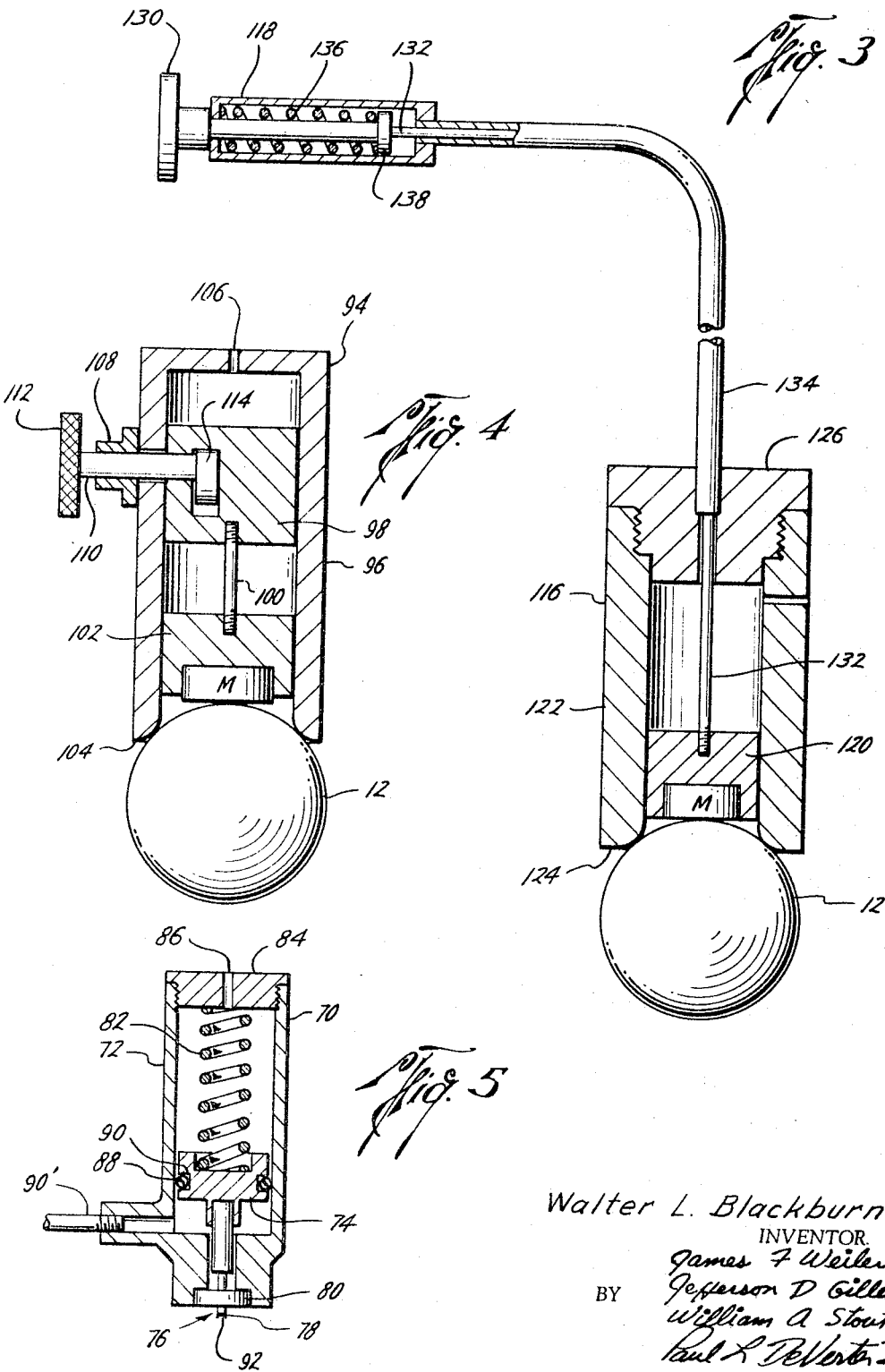

The present invention relates to a ball drop, and more particularly to a means for releasably securing a magnetizable ball and catching or receiving the released ball for particular use with laboratory instruments in measuring the effect of inertia, gravity, acceleration, and the like.

In laboratories, scientists are often called upon to make precise measurements of mass, inertia, and like effects, and one method of so doing is to provide a mechanism for dropping a ball and catching the ball in a container to which are attached instruments for measuring the time of descent, the receiving force, and the like. In the past, such mechanisms have suffered from the adverse effects of vibration in releasing the ball, as well as from the lack of any effective means to releasably secure a ball in such a manner that any movement other than vertical is imparted to the ball.

Further, the containers for receiving the ball have in the past affected the calibration instruments due to the lack of any method or means for squarely receiving the ball and holding it without rebound or side thrust.

Examples of the prior art structures which have generally required a source of electrical energy are seen in the patents to Klopsteg 1,636,234; Keefe 2,913,834; Brown 2,755,658 and Morgan 3,120,631. The present invention requires no such power source.

The present invention is directed toward a means for suspending a ball in a stationary position until the moment it is desired to be released, at which moment the ball is released exactly vertically with no vibration or lateral movement. Further, the present invention is directed toward a means for receiving and securing the dropped ball, again without inducing lateral thrust or sideward motion, so that precise laboratory calculations may be made.

Consequently, it is an object of the present invention to provide a ball drop having the foregoing advantages, and overcoming the disadvantages of the prior art structures.

It is another object of the present invention to provide a ball drop for particular use with a magnetizable ball wherein the ball may be held stationary and released at the desired moment without introducing extraneous movement.

Another object of the present invention is to provide a ball drop in which a magnetizable ball is held in a stationary position by a magnet, and when it is desired to release the ball, the magnet is moved so that the ball is no longer influenced by the magnetic field, thus allowing the ball to drop vertically.

A still further object of the present invention is to provide a ball catcher so constructed that the ball does not introduce any sideward or lateral movement when being caught.

Yet another object of the present invention is to provide a ball catcher which includes a tapered bore, so designed that the caught ball will wedge therein and thus be retained.

Another object of the present invention is to provide a ball catcher which includes a tapered bore with a magnet at the base thereof, to catch and retain a dropped ball and hold it by virtue of the magnetic field of the magnet.

Other and further objects, features and advantages will be apparent from the following description of the presently preferred embodiments of the invention, given for the purpose of disclosure, taken in conjunction with the accompanying drawings, where like character references designate like parts throughout the several views, and where:

FIGURE 1 is a partial front view, partially in section, illustrating one form of a ball drop device for releasably securing a ball and for catching the dropped ball, FIGURE 2 is a back view, partially in section, showing two forms of ball catchers, similar to a portion of that shown in FIGURE 1, FIGURE 3 is a partial sectional view of a modification of the releasable securing means which is actuated by a push rod, FIGURE 4 is a partial sectional view of a still further modification of the releasable securing means, actuated by a cam, and FIGURE 5 is yet a further modification of the releasable securing means, actuated by fluid movement.

The invention generally comprises a slidably mounted magnet in conjunction with stationary rest means, whereby a magnetizable ball may be held against the stationary means under the influence of the magnet until the magnet is moved, as well as a catcher having a tapered bore so designed to either frictionally engage or magnetically hold the caught ball.

Referring now to the drawings, and particularly to FIGURE 1, the reference numeral 10 generally designates the releasable securing means, shown with a ball 12 attached thereto, which ball is in turn directly mounted vertically over the ball receiver or catcher 14. Secured to and supporting the releasable securing means 10 is an arm 16, by means of the various adjusting screws 18. The arm 16 is in turn mounted on a vertical stand 20 which may be secured to a table or other surface 22 through a flange 24 by fastening means 26, here shown as screws. The arm 16 is secured to the stand 20 by means of an adjustable interconnection 28 which allows the releasable securing means 10 to be raised, lowered, or moved laterally from the stand 20.

In a somewhat similar manner, the catcher 14 is attached to an arm 30 which is in turn secured to the stand 20 by means of an adjustable fastening means 32. The adjustable fastening means 32 may include a rotatable journal, as will be hereinafter described with reference to FIGURE 2, or any other auxiliary instrument so as to measure the force or reaction of the ball 12 falling into and being held by the catcher 14. As all of the foregoing, with the exception of the releasable securing means 10 and the catcher 14, are conventional, no further explanation thereof is deemed necessary.

The releasable securing means 10 generally includes a cylinder 34 having a piston 36 slidable therein. Attached to the piston 36 is a plunger 38, the bottom end of which includes an embedded magnet M. Closing that part of the cylinder 34 which surrounds the plunger 38 is a stationary means, here shown as a cylinder head 40 which includes a pin 42 depending therefrom. The opposite end of the cylinder 34 is suitably closed with a cap 44 which includes an exhaust port or vent 46 therein.

Fluidly connected to the interior of the cylinder 34 beneath the lowermost position of the piston 36 is an inlet 48 to which is connected a fluid conduit 50, such as a rubber hose, and a fluid movement means 52, such as a syringe bulb.

It is now apparent that when the fluid movement means 52 is actuated, fluid is forced through the conduit 50 and the inlet 48 beneath the piston 36, thus forcing the piston 36 to rise within the cylinder 34, thereby raising the plunger 38 and the magnet M away from the cylinder head 40 and pin 42. Air above the piston 36 and within the cylinder 34 may be exhausted through the port 46 in the cap 44.

It is to be particularly noted that neither the cylinder head 40 nor the pin 42 moves physically with movement of the plunger 38 and magnet M. Consequently, in order for the magnet M to attract and hold the ball 12, the ball 12 must be made of a magnetizable material. A suitable material for the ball 12 is steel.

If the magnet M is quite powerful, it is apparent that the cylinder head 40 and pin 42 may be made of almost any material, whether magnetizable or not. On the other hand, if the magnet M is not quite so powerful, then the cylinder head 40 and pin 42 may be conveniently made of soft iron, which will tend to conduct magnetic flux when a magnet is in close proximity thereto.

In any event, the releasable securing means 10 is so constructed that the magnet when, in a first lower position, is in sufficiently close proximity to the ball 12 so that the magnetic flux from the magnet M will attract and hold the ball 12 stationary. Further, the releasable securing means 10 is so constructed that when the magnet M is in a second position, the magnetic flux from the magnet M is not strong enough to retain the ball 12 because of the ball's own weight, and consequently the ball will drop. In the embodiment shown in FIGURE 1, and hereinabove described, the magnet M is moved from its first to its second position, shown in broken lines, by actuating the fluid movement means 52 from any remote position.

It is now apparent that the present invention has provided a ball drop which will releasably secure a ball in a fixed position, without imparting any movement thereto, until the operator desires to drop the said ball. At this time, the only force affecting the ball will be that of gravity.

As previously described, the fluid movement means 52 may comprise a syringe bulb, and as is well known, such a bulb generally includes an air inlet valve in one end, and an air outlet valve or tube in the other. If this type of bulb is utilized in practicing the present invention, once air is passed from the fluid movement means 52 through the conduit 50 and inlet 48 into the cylinder 34 beneath the piston 36, then the piston 36 will remain in its upper position until the air is vented. This may, of course, be accomplished simply by removing the conduit 50 from the inlet 48, or it may be accomplished by including an appropriate valve at the fluid movement means 52. However, in the present invention, it is preferred that the fluid movement means 52, when comprising a bulb, be of the type which does not include an inlet valve so that upon release of the bulb any air forced into the cylinder 34 will be withdrawn back to the bulb, thus rapidly returning the magnet M to its original position in preparation for a further experiment. Those skilled in the art will recognize that the fluid movement means 52 need not be a bulb, but may instead comprise a compressed air source, a water line, or any other fluid movement means.

Referring again to FIGURE 1, and particularly to the catcher 14, it will be noted that the catcher is here shown as a generally cylindrical cup 15 having a tapered bore 52 therein. The diameter of the bore facing the releasable securing means 10 is preferably greater in diameter than the ball 12 which will be used, and the bore decreases in diameter so that the ball 12 may be snugly engaged therein. The particular angle of the taper of the bore 54 is variable and is preferably of such an angle that it will retain the ball 12 by frictional engagement therewith when the ball 12 is dropped therein. Leading from the bore 54 and through the cup 15 is an exhaust port 56, whose function is to release any air which may be caught in the bore 54 beneath the ball 12 as the ball is dropped into the catcher 14.

Upon proper alignment of the catcher 14 beneath the releasable securing means 10, it is assured that the ball 12 will fall directly therein, without inducing side thrust or lateral movement to the catcher 14. Consequently, laboratory measurements may be made with any conventional force measuring devices.

Referring now to FIGURE 2, it is seen that the arm 30 includes a journal 58 positioned at the center of gravity of the completed arm 30 with catcher 14. The journal 58 is here shown as a ball bearing, although any other type of suitable journal may be utilized. The journal 58 is in turn connected through a pin 60 to the adjustable fastening means 32, which is in turn attached to the stand 20. In this form of the apparatus, when the released ball 12 is caught by the catcher 14, the weight of the ball 12 will cause the arm 32 to rotate about the pin 60 because of the journal 58. The number of revolutions imparted may be used as some measure of the weight or impact characteristics of the ball 12, as well as a test of the measure of the efficiency of the journal 58.

In addition to the catcher 14 shown at one end of the arm 30, a modification thereof is shown as the catcher 62. As was the case with the catcher 14, the modified catcher 62 likewise includes a tapered bore 64 and an exhaust port 66 opposite the large end of the bore 64. Additionally, placed at the bottom of the bore 64 is a magnet 68, so situated that when the ball 12 is settled in the bore 64, the magnetic flux from the magnet 68 will retain the ball 12 in the catcher 62. Whether physical contact between the magnet 68 and the ball 12 is necessary is determined entirely by the strength of the magnet 68.

After the experiments have been concluded, and it is desired to remove the ball 12 from either the catcher 14 or 62, this may be quite efficiently done simply by rapping the catcher, or in the alternative by pushing the ball 12 therefrom by means of a rod inserted through the exhaust port 56 or 66.

Various modifications may be made in the releasable securing means 10, each embodying the principles of the foregoing device. With reference now to FIGURE 5, another type of fluid operated releasable securing means 70 is shown. In this instance, the means 70 generally include a cylinder 72 having a piston 74 situated therein. Attached to the piston 74 is a magnet M which is here shown resting upon the stationary means 76, comprising a pin 78 and cylinder head 80. Within the cylinder 72 and pressing against the piston 74 is a spring 82, which is retained within the cylinder by means of an end cap 84 attached to the cylinder. The end cap 84 includes an exhaust port 86. Mounted on the piston 74 may be any conventional sealing means, such as the O-ring 88 set within the groove 90.

Situated on the cylinder 72 is the inlet 90 whereby fluid may be induced through the inlet 90 and into the cylinder 72 beneath the piston 74, thus causing the piston 74 and attached magnet M to rise, thus cutting off flux from the magnet M through the stationary means 76. Air above the piston 74 and within the cylinder 72 is exhausted through the port 86. Upon release of the applied fluid through the inlet tube 90, the spring 82 will return the piston 74 and magnet M to the position shown in FIGURE 5.

It is to be noted that the end of the pin 78 to which the ball 12 is releasably secured includes a dished out portion 92 which is shaped to receive the ball. The function of the dished out portion 92 is to prevent the ball 12, when applied thereto, from moving. This same feature may be applied to the pin 42 previously shown in FIGURE 1. Any conventional means may be utilized to induce the fluid movement through the inlet 90.

In addition to the fluid operated releasable securing means 10 and 70 described hereinabove, mechanically operated devices may likewise be used to move the magnet M, thus releasing the ball 12.

Referring now to FIGURE 4, a cam operated releasable securing means 94 is shown. In this instance, the body 96 includes a piston 98 slidably mounted therein. Attached to the piston 98, by means of a threaded rod 100, is a guide 102 to which is attached the magnet M. Forming the lower portion of the body 96 is the stationary means 104 against which the ball 12 rests when under the influence of the magnet M. Above the piston 98 and extending through the body 96 is an exhaust port 106 whose function is to release air entrapped between the piston 98 and the body 96 when the piston is slid therein. Attached to the body 96 is a journal 108, and rotatably mounted therein is the shaft 110 which includes a knob 112 without the body 96 and an eccentric or cam 114 engaging the piston 98.

To utilize the releasable securing means 94, the ball 12 is held against the stationary means 104, and the knob 112 is rotated so that the cam 114 allows the piston 98, rod 100, guide 102, and magnet M to attract and hold the ball 12. Thereupon, when it is desired to release the ball 12 so that it will fall solely under the influence of gravity, and without any side or lateral thrust, the knob 112 is rotated, thus rotating the shaft 110 within the journal 108, and rotating the cam 114. This in turn slides the piston 98 within the body 96, thereby raising the piston 98, rod 100, guide 102, and magnet M so that the ball 12 is no longer held against the stationary means 104 by means of the magnetic flux. Consequently, the ball 12 will drop. Any air entrapped between the piston 98 and body 96 may escape through the port 106.

A still further modification of the releasable securing means is shown in FIGURE 3, to which reference is now made. In this instance, the releasable securing means 116 is operated by a push rod 118. As was the case with the releasable securing means 94, the magnet M is secured to a guide 120 which is slidable within a body 112, in the form of a cylinder, and the end of the body 122 against which the ball 12 is held comprises the stationary means 124. Attached to the opposite end of the body 122 is an end cap 126, and mounted therein is the push rod 118, very similar to an automobile choke control. Thus, the push rod 118 includes a knob 130 which is attached to a flexible stem or shaft 132. The shaft 132 is in turn encased in an armored sheath or cable 134 which is attached to the end cap 136 at one end. The other end of the cable 134 is enlarged and may enclose a spring 136 therein which acts against the cable 134 and a shoulder 138 mounted on the shaft 132. Within the body 122, the shaft 132 is attached to the guide 120. Consequently, reciprocation of the knob 130 results in reciprocation of the magnet M by virtue of reciprocation of the shaft 132 and guide 120.

In use, therefore, the knob 130 is pushed into the cable 134 and the ball 12 is held against the stationary means 124 until the magnet M is in such position to attract and hold the ball 12. Thereupon, to release the secured ball 12, the knob 130 is pulled, which in turn overcomes the spring 136 and pulls the shaft 132, thus pulling the guide 120 within the body 122 and moving the magnet M away from the ball 12. This, in turn, allows the ball 12 to drop when the magnetic flux is no longer able to hold it, and thus the ball will be affected only by gravity, and particularly will not have side or lateral thrusts imposed on it.

Each of the embodiments in FIGURES 3–5 may be substituted for the releasable securing means 10 shown in FIGURE 1. Further, either of the catchers 14 or 62 may be utilized to receive the dropped ball 12. In each instance, it will be noted that the ball 12 is held by the magnet M against the stationary means until the magnet M is displaced far enough to allow the ball to fall of its own weight. Consequently, the present invention is ideally suited for laboratory use in experiments concerning the effects of inertia, gravity, acceleration, and the like.

The present invention, therefore, is well adapted to carry out the objects and attain the ends and advantages mentioned, as well as others inherent therein. While presently preferred embodiments of the invention have been given for the purpose of disclosure, numerous changes in the details of construction, and the combination, shape, size, arrangement of parts, and uses may be resorted to without departing from the spirit and scope of the invention as hereinafter claimed.

What is claimed is:

1. A ball drop instrument comprising:
 a magnetizable ball,
 a releasable securing means for holding and releasing the ball, and
 a catcher vertically spaced beneath the releasable securing means for receiving the ball when released,
 the releasable securing means including:
  an elongate body,
  a stationary means connected to the lower end of the body,
  a magnet slidably supported by the body, holding the ball against the stationary means when the magnet is positioned adjacent the stationary means, and releasing the ball when the magnet is moved away from the stationary means, and
  means to move the magnet away from the stationary means;
 the catcher including:
  a cup, and
  a tapered bore within the cup sized to engage the ball when dropped therein.

2. The invention of claim 1 wherein the means to move the magnet includes fluid means.

3. The invention of claim 1 wherein the means to move the magnet includes a cam.

4. The invention of claim 1 wherein the means to move the magnet includes a push rod.

5. The invention of claim 1 wherein the catcher includes a magnet mounted within the tapered bore.

6. The improvement in a catcher for a ball drop utilizing a magnetizable ball comprising:
 a cup,
 a tapered bore within the cup sized to engage the ball when dropped therein,
 said cup including an exhaust port adjacent the smaller diameter portion of the tapered bore, and
 a magnet mounted within the tapered bore of the cup.

7. A ball drop releasable securing means for use with a magnetizable ball including:
 an elongate cylinder mounted vertically,
 a stationary means forming the lower end of the cylinder,
 the stationary means sealing the lower end of the cylinder,
 an end cap closing the upper end of the cylinder,
 the cap having a vent extending therethrough,
 a piston slidable in the cylinder,
 a magnet attached to the piston and movable to a first position within the cylinder adjacent the stationary means, and to a second position removed from the stationary means,
 the magnet securing the ball to the stationary means when in the first position,
 the magnet releasing the ball when in the second position, and
 means to slide the piston and attached magnet in the cylinder, including:
  an inlet tube extending into the cylinder beneath the piston, a fluid conduit attached to the tube, and
fluid movement means attached to the conduit, whereby
actuation of the fluid movement means slides the
piston and results in moving the magnet from
the first to the second position.

8. The invention of claim 7 including
a spring yieldingly urging the piston toward the first
position.

References Cited by the Examiner
UNITED STATES PATENTS

| | | | |
|---|---|---|---|
| 2,636,738 | 4/1953 | Abagoff | 273—96 |
| 2,693,979 | 11/1954 | Russell | 294—65.5 |
| 2,755,658 | 7/1956 | Brown | 73—12 |

EUGENE R. CAPOZIO, *Primary Examiner.*

H. S. SKOGQUIST, *Assistant Examiner.*